(12) United States Patent
Bohme et al.

(10) Patent No.: US 11,982,840 B2
(45) Date of Patent: May 14, 2024

(54) LASER-BASED SPLICING OF GLASS FIBERS ONTO OPTICAL COMPONENTS

(71) Applicant: Fraunhofer-Gesellschaft zur Forderung der angewandten Forschung e.V., Munich (DE)

(72) Inventors: Steffen Bohme, Jena (DE); Thomas Schreiber, Jena (DE); Simone Fabian, Jena (DE)

(73) Assignee: Fraunhofer-Gesellschaft zur Forderung der angewandten Forschung e.V., Munehen (DE)

( * ) Notice: Subject to any disclaimer, the term of this patent is extended or adjusted under 35 U.S.C. 154(b) by 511 days.

(21) Appl. No.: 17/365,485

(22) Filed: Jul. 1, 2021

(65) Prior Publication Data

US 2022/0003930 A1   Jan. 6, 2022

Related U.S. Application Data

(63) Continuation of application No. 14/361,769, filed as application No. PCT/EP2012/004875 on Nov. 26, 2012, now abandoned.

(30) Foreign Application Priority Data

Nov. 30, 2011   (DE) .......................... 102011119713.7

(51) Int. Cl.
  *G02B 6/255*   (2006.01)
  *G02B 6/32*    (2006.01)

(52) U.S. Cl.
  CPC .......... *G02B 6/255* (2013.01); *G02B 6/2551* (2013.01); *G02B 6/32* (2013.01)

(58) Field of Classification Search
  CPC .................................................... G02B 6/2551
  See application file for complete search history.

(56) References Cited

U.S. PATENT DOCUMENTS

| | | | |
|---|---|---|---|
| 6,360,039 B1 * | 3/2002 | Bernard | G02B 6/2551 385/38 |
| 2001/0014198 A1 * | 8/2001 | Walters | G02B 6/32 385/96 |
| 2002/0041742 A1 * | 4/2002 | Bernard | G02B 6/262 219/121.64 |

* cited by examiner

*Primary Examiner* — Erin Snelting
(74) *Attorney, Agent, or Firm* — Adams and Reese LLP; Ray R. Ferrera

(57) ABSTRACT

The invention relates to a method for laser-based splicing of a glass fiber (1) onto an optical component (3), comprising the following steps:
  arranging both surfaces to be spliced substantially parallel to each other and at a predefined distance from each other; and
  aiming a laser beam (4) at the optical component (3).
In order to specify an improved method in which the properties of the joining partners are maintained to the greatest extent during splicing, which exhibits high reproducibility and in particular is suitable for splicing joining partners of different cross-sections, the invention proposes that the angle of incidence of the laser beam (4) on the surface of the optical component be between 15° and 45°.

13 Claims, 1 Drawing Sheet

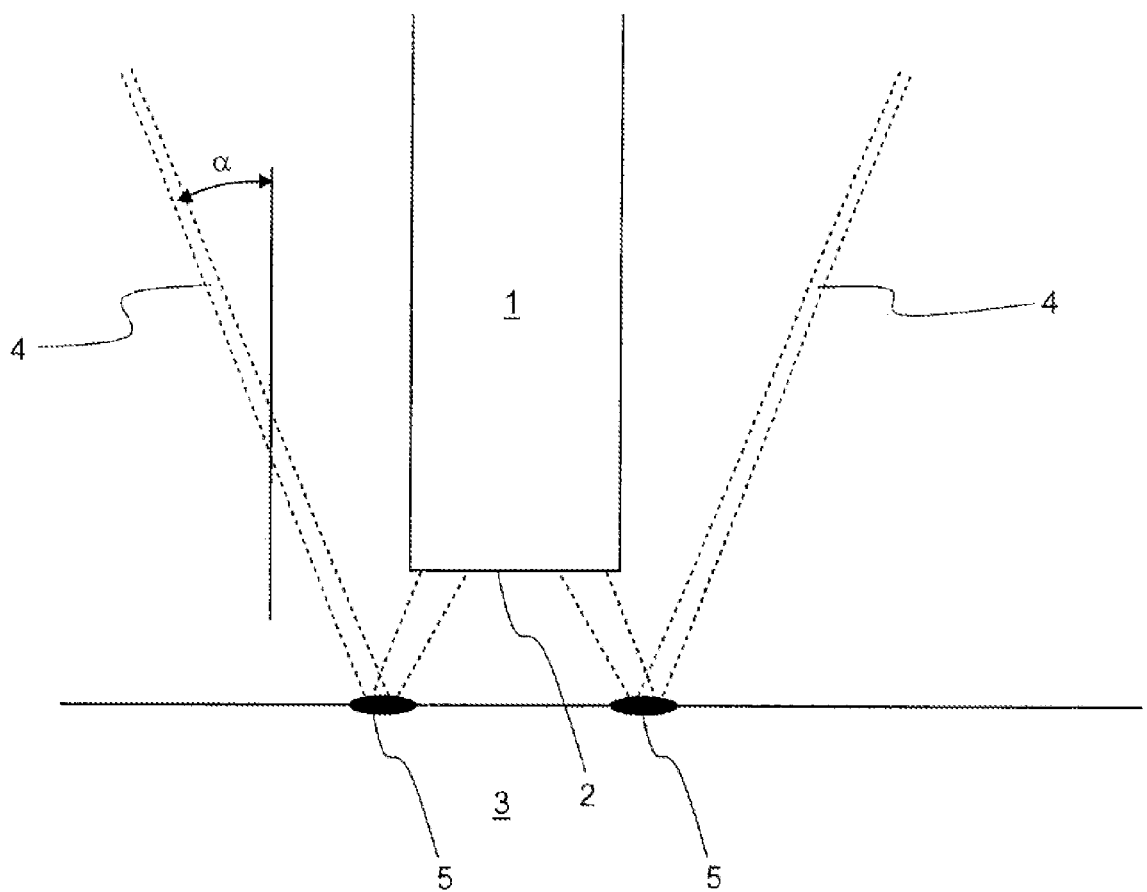

LASER-BASED SPLICING OF GLASS FIBERS ONTO OPTICAL COMPONENTS

The invention relates to a method for laser-based splicing of a glass fiber onto an optical component, comprising the following steps:
arranging both surfaces to be spliced substantially parallel to each other and at a distance from each other; and
aiming a laser beam at the optical component.

Splicing as joining method is particularly applied with fibers and optical components utilized for the proliferation of optical performances in a kW range (e.g. fiber laser).

Eligible as optical components, for example, are silica glass end caps utilized for sealing and environmentally protecting photonic crystal fibers (PCFs) in which light guidance is partly accomplished through air ducts. In addition, the end caps provide a possibility for functionalizing, e.g. an AR coating, or providing the end cap with a spherical or aspheric surface, and at the same time they can be utilized as holding or adjusting element. It is possible that the end caps have a greater diameter than the fiber, whereby the use of conventional splicing devices is not feasible.

If joining partners with different cross-sections, specific waveguide structures and/or different endowments, e.g. PCFs, are connected mechanically stable and without losses in quality of material, then a $CO_2$ laser is preferably used as heat source. The reason is that the laser wavelength of a $CO_2$ laser is very well absorbed by the materials of the joining partners (usually silica glass). Moreover, contamination due to process gases or sedimentation of electrode or wire material occurring in conventional processes is thereby ruled out. And a quick change between components to be differently spliced is also feasible, if process parameters are already known, without requiring a change of electrodes or gas nozzles, for example, which are subject to wear and tear or without requiring a "running-in" of the process.

A method of this kind is disclosed, for example, in EP 1 128 960 B1 according to which the surface of an optical component is irradiated with a laser beam having a nearly vertical angle of incidence, and thus warmed-up.

But it has become evident that a method of this kind is not suitable for splicing of special fibers, e.g. PCFs, as well as fibers manufactured from different materials, e.g. Panda fibers and passive/active single-mode fibers of low guidance, because often much too high temperatures occur which destroy or adversely affect the material structure of a special fiber.

During splicing of PCFs onto optical components, it is required that the air ducts extend up to the splicing point and be not destroyed, i.e. collapse, before in order to maintain the optical properties.

For special fibers comprised of different or differently endowed materials, however, it is important to maintain the material properties during the splicing procedure that are attributable to the different composition of the fiber. Too high temperatures during splicing may entail diffusion or degassing processes which adversely affect the optical properties of a fiber.

Now, therefore, it is the object of the present invention to specify a method improved versus state of the art, in which the properties of the joining partners are maintained to the greatest extent during splicing, which exhibits high reproducibility and in particular is suitable for splicing joining partners of different cross-sections.

This object is achieved by providing for an angle of incidence of the laser beam onto the surface of the optical component that ranges between 10° and 60°, preferably between 15° and 45°.

The angle of incidence within the purport of the present invention is the angle between the laser beam direction and the surface normal of the optical component.

Within the purport of the present invention, the term "glass fiber" not only covers a single optical fiber, but also a bundle of fibers, the individual fibers of which are simultaneously to be spliced onto the optical component.

By way of the present invention, it is achieved that only part of the laser performance takes effect on the glass fiber surface to be spliced, because only part of the laser energy, owing to the Fresnel reflection, is reflected from the surface of the optical component and can reach to the surface of the glass fiber. By way of an appropriate choice of the distance between the surface of the optical component and the glass fiber, the angle of incidence of the laser beam and/or polarization of the laser radiation, both surfaces can be brought to the optimal temperature for splicing in a unique process step without exposing the surfaces to an undesired and too high a thermal load. In particular, by way of the present invention, selected areas of the glass fiber can remain thermally unloaded to a great extent, even though the distance between the glass fiber and the optical component is very small. In this case, the structure of the glass fiber is reliably maintained during the splicing procedure.

It is also possible that the glass fiber already contacts the optical component during splicing, i.e. that the distance between the joining partners is zero, rather than bringing it in contact with it only after reaching the splicing temperature as is common practice.

A preferred embodiment of the method provides for generating the laser beam with a $CO_2$ laser source. The high absorption of the $CO_2$ laser wavelength by the joining partners causes excellent incipient melting of the same. Besides, by way of an appropriate choice of the laser performance, it is feasible to control the temperature of the joining partners to be achieved infinitely and very precisely which leads to very good and reproducible results.

It is further preferred that the laser beam is configured as an annular beam. Accordingly, the laser beam irradiates an annular zone on the surface of the optical component. This annular zone can be irradiated entirely. Likewise, it is possible to irradiate ring segments only. This can be accomplished by means of appropriate optics through beam forming. Alternatively, it is possible to guide the laser beam continuously via the annular zone on the surface of the optical component. Thereby, only an annular area at the surface of the optical component is heated-up and reflected onto the surface of the glass fiber, whereby the interior area of the glass fiber is only slightly subjected to thermal loads, depending on set laser performance, polarization, the angle of incidence of the laser beam and on the distance of the joining partners. This is advantageous especially for PCFs which often have an interior area with air ducts so that a collapse of the inner structure during splicing can be counteracted.

In particular it is possible to vary the shape and/or size of the annular zone during the splicing procedure. This can be accomplished by altering the focus of the laser radiation (variation of the ring width). Likewise, laser optics and the optical component can be moved relatively towards each other. Without changing the angle of incidence, the diameter of the annular zone will thus change. This variation serves for a selective (timed) temperature control at the surfaces of the joining partners during the splicing procedure.

In a preferred practical example of the present invention, the diameter of the annular zone is greater than the diameter of the glass fiber. Thereby it can be achieved that the surface of the optical component is more strongly heated-up for the purpose of softening, whereas the glass fiber is only slightly warmed-up in order to establish a stable splice connection. The glass fiber is not hit directly by the laser radiation, and an undesired adverse impact on the glass fiber due to thermal load is avoided.

In a still further preferred embodiment, the laser beam is not focused onto the surface of the optical component so as to be able to accomplish a more homogeneous incipient melting of the surface of the optical component over a wider area. Furthermore, it is thus made possible to reduce the portion of laser radiation reflected to the surface of the glass fiber. In this manner, by way of appropriately adjusting the laser performance, angle of incidence, and focusing the laser beam as well as the distance between the joining partners, it is possible to control thermal load of the surface of the glass fiber virtually independent of that of the optical component.

With a preferred configuration of the inventive method, the performance of the laser beam as a function of time is varied during the splicing procedure. For example, the laser performance is initially increased continuously from a start value up to a finish level. And then, the warmed-up and/or incipiently molten surfaces of the joining partners are brought into contact with each other to establish the splice connection. Upon establishing the connection, the performance of the laser beam as a function of time can be continuously decreased. A slow "ramping-up" of the laser performance can be utilized for a gentle warm-up of the joining partners in the area of the splice point. Likewise, a steady reduction in laser performance takes the effect that undesired material strains and stresses as well as relevant mechanical deformation which would adversely affect the quality of the optical connection are avoided in the area of the finished splice.

The inventive method is especially suitable for splicing of special fibers, e.g. PCFs, as well as fibers made of different materials or having differently endowed areas, e.g. Panda fibers or passive/active single-mode fibers of low guidance. The inventive method ensures that the material structure of special fibers is not destroyed or adversely affected during splicing.

The invention is described now on the basis of a preferred practical example, where:

FIG. 1 shows a schematic side view of two joining partners.

FIG. 1 schematically shows a glass fiber 1 having a surface 2 to be spliced. Located in an arrangement facing the surface 2 to be spliced is an optical component 3. Glass fiber 1 and optical component 3 are manufactured from silica glass. In FIG. 1, for example, an end cap splice is produced at a PCF.

The surface 2 to be spliced is arranged substantially parallel to the surface of the optical component 3 and at a distance from it.

A laser beam 4 is aimed at the section of the surface of the optical component 3 which is to be connected with the glass fiber 1, and it has an angle of incidence a which should range between 15° and 45°.

The laser beam 4 is a laser beam formed as an annular beam from a $CO_2$ laser source not shown here, which for the sake of clarity is only represented schematically by the dashed lines designated with number 4. Radiation 4 in this practical example has a cone shell shape which is generated either by beam forming by means of suitable optical components or by continuous deflection of the laser beam 4. The laser beam 4 irradiates an annular zone 5, the diameter of which is greater than that of glass fiber 1. Glass fiber 1 is not hit directly by the laser beam 4.

As one may recognize in FIG. 1, the laser beam is not focused onto the surface of the optical component 3. The slightly divergent bundle of beams of the laser beam 4 hits onto the surface of the optical component 3 and there it irradiates the annular zone 5 which on account of defocusing has a corresponding width.

The surface of the optical component 3 is heated by the laser radiation 4 up to the softening of the material.

Part of the laser beam 4, dependent upon laser beam focusing and angle of incidence a, is reflected from the surface of the optical component 3 and directed to the surface 2 of glass fiber 1 where it causes a warm-up of glass fiber 1 without this leading to a softening and thus to a destruction of the structure of glass fiber 1. However, warming-up the fiber 1 is required to ensure a stable splice connection.

When the glass fiber 1 and the optical component 3 have reached the relevant desired temperature, they are brought into contact in order to establish the splice connection (not shown here).

The invention claimed is:

1. A process for splicing a glass fiber onto an optical component, said method comprising:
    disposing a cross-sectional surface of said glass fiber and a surface of said optical component at a distance from one another; and
    directing an annular-shaped laser beam at said optical component surface so that the laser beam is aiming toward but not focused on said optical component surface and also does not directly hit said glass fiber,
    wherein an angle of incidence of the laser beam as it is aiming toward said optical component surface is between 10 degrees and 60 degrees;
    and the distance between said glass fiber cross-sectional surface and said optical component surface and the angle of incidence are chosen such that said laser beam irradiates a portion of an annular zone of said optical component surface until said annular zone of the optical component begins to soften, and
    said laser beam is reflected from said optical component surface toward the glass fiber cross-sectional surface, and warms said glass fiber cross-sectional surface without said cross-sectional surface softening, so that said glass fiber cross-sectional surface and said optical component surface are spliced together.

2. The method of claim 1, wherein said angle of incidence is between 15 degrees and 45 degrees.

3. The method of claim 1, wherein said laser beam is polarized.

4. The method of claim 1, further comprising: generating said laser beam using a $CO_2$-laser source.

5. The method of claim 1, further comprising: irradiating the entirety of said annular zone on said optical component surface.

6. The method of claim 1, further comprising: varying an annulus width of said annular zone during the splicing process.

7. The method of claim 1, further comprising: varying a diameter of said annular zone during the splicing process.

8. The method of claim 7, further comprising: varying the diameter of said annular zone such that the diameter of the annular zone is greater than a diameter of the glass fiber cross-sectional surface.

9. The method of claim 1, further comprising: varying performance characteristics of the laser beam as a function of time during the splicing process.

10. The method of claim 1, wherein said glass fiber is pure silica glass.

11. The method of claim 1, wherein said glass fiber is doped silica.

12. The method of claim 1, wherein said glass fiber is a photonic crystal.

13. The method of claim 1, wherein said glass fiber comprises a plurality of doped regions.

* * * * *